United States Patent [19]

Vaux

[11] Patent Number: 4,846,457
[45] Date of Patent: Jul. 11, 1989

[54] IMPACT-ABSORBING SAFETY MATTING SYSTEM FOR A SPORTS GAME SURFACE

[75] Inventor: Thomas M. Vaux, Kirkland, Wash.

[73] Assignee: Safety Surfaces, Inc., Kirkland, Wash.

[21] Appl. No.: 152,817

[22] Filed: Feb. 5, 1988

Related U.S. Application Data

[63] Continuation-in-part of Ser. No. 767,718, Apr. 23, 1986, Pat. No. 4,727,697, which is a continuation of Ser. No. 364,811, Apr. 2, 1982, abandoned.

[51] Int. Cl.$^4$ ............................................... A63B 5/18
[52] U.S. Cl. ........................................ 272/3; 52/177; 273/193 R; 404/32; 404/35
[58] Field of Search ...................... 52/177; 5/443, 444, 5/448, 449, 465, 480, 481, 417–420; 272/3, 4, 5, 109; 273/195 A, 195 R; 404/32, 35, 36, 37, 43

[56] References Cited

U.S. PATENT DOCUMENTS

| | | | |
|---|---|---|---|
| 957,387 | 5/1910 | Stedman | 404/32 |
| 2,920,846 | 1/1960 | Lingafelter | 404/35 X |
| 2,999,431 | 9/1961 | Mitchell | 404/32 |
| 3,251,076 | 5/1966 | Burke | 272/109 |
| 3,846,945 | 11/1974 | Roby | 52/177 |
| 4,501,420 | 2/1985 | Dury | 404/35 X |
| 4,557,475 | 12/1985 | Donovan | 272/3 |
| 4,572,700 | 2/1986 | Mantarro et al. | 404/35 |

FOREIGN PATENT DOCUMENTS

| | | | |
|---|---|---|---|
| 58825 | 9/1982 | European Pat. Off. | 272/3 |
| 92837 | 11/1983 | European Pat. Off. | 272/3 |

Primary Examiner—David A. Scherbel
Attorney, Agent, or Firm—Joseph Scafetta, Jr.

[57] ABSTRACT

Impact-absorbing safety matting systems include a helipad, a mat for children's play areas, and an athletic sports game surface. All systems have a surface layer with a botton and outer edges, an array of air-filled cells affixed to the bottom of the surface layer, ribs extending a defined distance from the bottom of the surface layer for defining the array of air-filled cells, sealer and aggregate spread over the surface layer and the base immediate to edges, and median ribs extending a shorter distance from the bottom of the surface layer than the defining ribs in order to give added support against a strong blow striking the surface layer and the array of air-filled cells affixed thereto. Each helipad, children's play mat, and athletic sports game surface is characterized by a void area left in place of at least one median rib in order to facilitate cutting through the surface layer, a second layer of sealer spread under the array of air-filled cells and above a base in order to prevent the escape of air from the air-filled cells and to hold the array of air-filled cells in a substantially vertical orientation, a sealer and aggregate spread over the surface layer of the mat in order to prevent deterioration of the mat and loss of shock-attenuating properties resulting from exposure to the sun's ultra-violet rays, and a sloping outer edge surrounding all sides in order to prevent the escape of air therefrom. In lieu of the sloping outer edge, a beveled outer edge may be provided in order to facilitate attachment to and placement in a recess in the base so that an integrated installation is obtained.

15 Claims, 6 Drawing Sheets

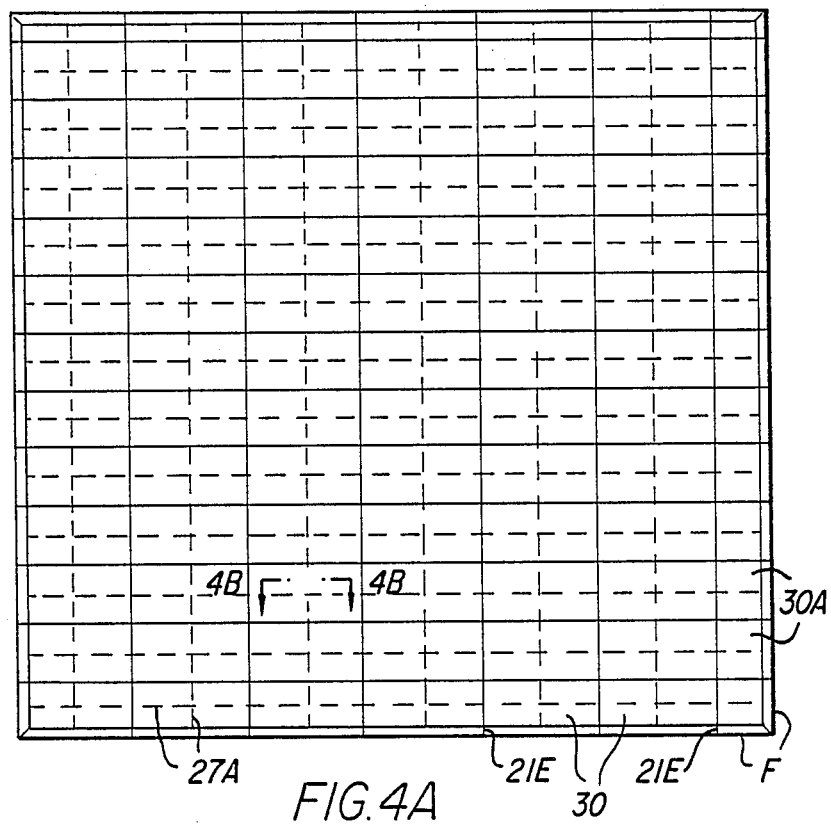
FIG.4A
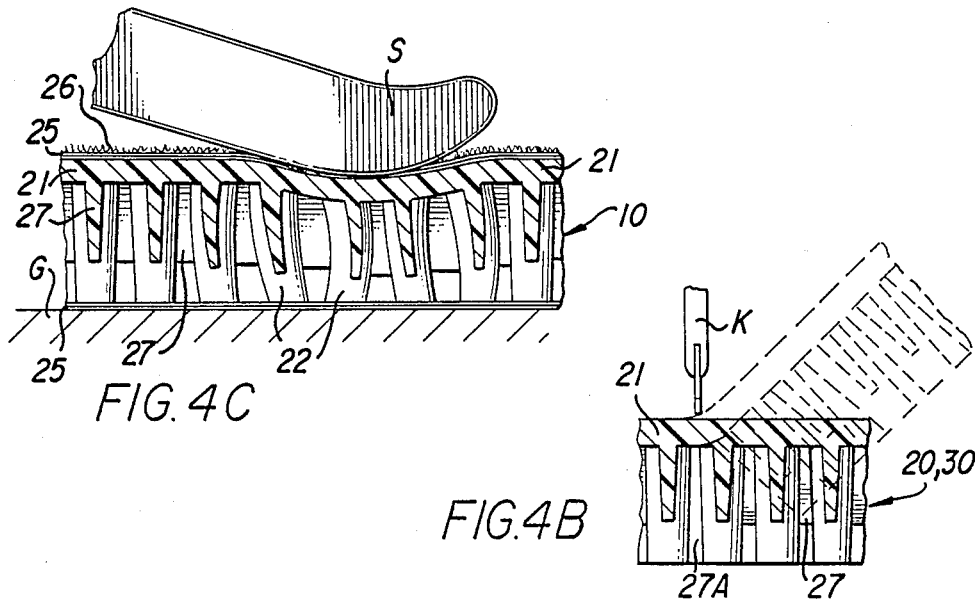
FIG.4C
FIG.4B

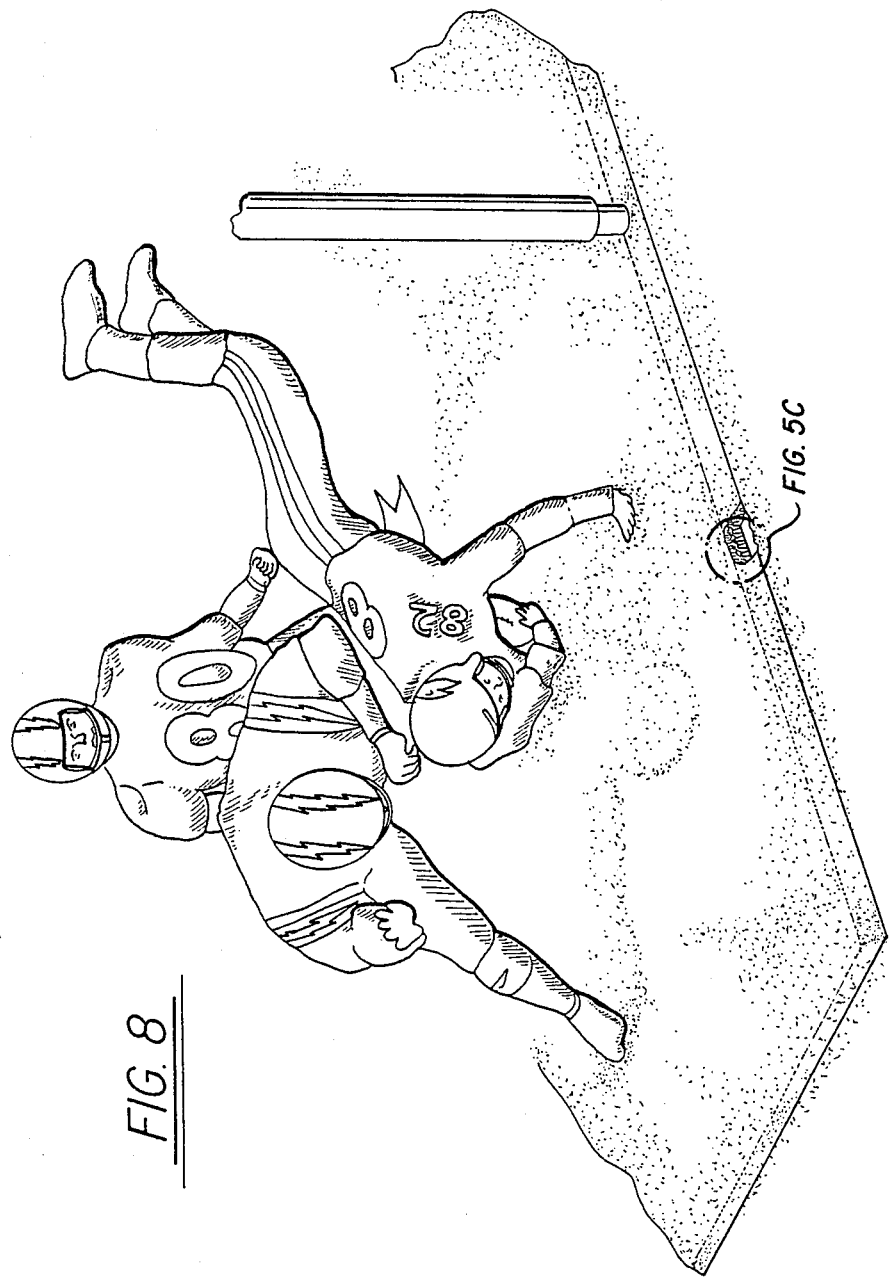

IMPACT-ABSORBING SAFETY MATTING SYSTEM FOR A SPORTS GAME SURFACE

CROSS-REFERENCES TO RELATED APPLICATIONS

This application is a continuation-in-part of U.S. patent application Ser. No. 767,718, filed Apr. 23, 1986, now issued as U.S. Pat. No. 4,727,697 on Mar. 1, 1988, which is a continuation of U.S. patent application Ser. No. 364,811, filed Apr. 2, 1982, now abandoned.

BACKGROUND OF THE INVENTION

1. Field of the Invention

The present invention relates generally to static structures, particularly traffic-carrying surfaces, and also relates generally to exercising devices, particularly gymnastic equipment.

2. Description of the Related Art

Helipads used for both civilian and military applications have usually consisted of an asphalt or concrete substrate that is coated with urethanes of various colors to form a predetermined pattern. The urethane coatings are generally applied just 1/64 inch (8 millimeters) thick and, consequently, provide no significant benefit other than clearly marking a landing zone.

Also, school playgrounds, day care centers, playlands adjacent to fast food restaurants, and the like, maintain exercising equipment for children's recreational activities. The activities in these designated play zones include climbing, jumping and swinging, and oftentimes result in falls to the ground. In fact, 70% of playground injuries are the result of impacts to the underlying surface.

Play on sports surfaces for games, such as football, soccer and baseball, is also likely to produce falls but is carried out on fields that are usually constructed of artificial turf laid over an attenuating base.

Before the advent of artificial turf, natural grass was grown as a surface underneath playground equipment and athletic fields. Unfortunately, natural grass requires constant maintenance and varies in its shock attenuating ability. Furthermore, erosion, puddling and sanitation are major negative factors militating against the use of natural grass.

In the search for an answer to the problems posed by natural grass, loose-fill materials and unbonded particles, such as wood chips and sand, were placed under playground equipment to a depth averaging twelve inches. The material was usually contained by a wooden or concrete border. Although loose-fill materials provided excellent attenuating characteristics, it is difficult to maintain them at the proper depth and to keep them free of contamination. Changes in depth and infiltration by debris adversely affect the attenuating properties of such loose-fill materials.

With a desire for a more permanent and consistent surface, non-loose-fill surfaces in the nature of processed particles bonded together in some fashion were developed to be installed over hard surfaces, such as concrete and asphalt. Nonloose-fill surfaces, which are generally referred to as synthetics, can be divided into two main categories: systems with seams and systems without seams. Examples of systems with seams or so-called nonseamless systems are shown in U.S. Pat. Nos. 4,557,457 to Donovan, 3,846,945 to Roby, 3,251,076 to Burke, 2,999,431 to Mitchell, and 957,387 to Stedman.

Both nonseamless and seamless surfacing systems have an attenuating element and a surface layer. This surface layer can be either installed in the field or integrated at the time of manufacture. However, the seamless systems have a texture coat of sealer and aggregate applied over the surface layer to form a monolithic arrangement. Seamless surfacing systems are becoming the more desirable of the synthetic systems because insects and rodents cannot enter and nest in them, nor can dirt and debris collect in the seams. An additional benefit of seamless surfacing systems is that water is not allowed to enter into the system. Water, when introduced into the system, can cause structural deterioration and delamination of the surface system from its subbase.

SUMMARY OF THE INVENTION

A seamless protective surfacing system for aircraft, such as helicopters, uses an integrated helipad which will attenuate the forces associated with the shock load that the aircraft experiences on touchdown. The protective system will attenuate the rotor vibrations of the helicopter as it is idling and makes an excellent surface for handling and loading munitions, since it reduces the risk of accidental detonation or of damage to the munitions in the case of material mishandling. Traffic-carrying surfaces for areas where munitions are handled have generally been metallic or concrete because heavy equipment, such as motorized carts and utility vehicles for moving materials, were required to pass over them. Although metal and concrete make good transportation surfaces and are easy to clean, they provide no attenuating protection for munitions or mechanical parts that may be dropped.

Thus, it is an object of the present invention to provide a seamless surfacing system for use under munitions handling areas that will be substantially protected against damage arising from the accidental dropping or mishandling of munitions.

The invention is also a protective system to be installed over a hard surface where falls to the ground are likely. Zones under exercising equipment on school playgrounds, day care centers, and playlands adjacent to fast food restaurants are examples of areas where the invention can be used to minimize injuries that are likely to occur in such play environments. Athletic fields for football, soccer, baseball, and the like are areas where the invention can be used to minimize injuries that are likely to occur in such sports environments.

Other miscellaneous uses where the protective surfacing system of the present invention can be used are physical therapy rooms for the disabled and the elderly, landing zones at the base of firefighter's poles, and operating rooms in veterinary clinics.

Finally, the recognized methodology for testing the shock attenuating properties of playground and athletic surfacing systems is the ASTM F-355 test which uses three different objects at impact velocities appropriate for the intended end-use: first, a cylindrical missile, weighing twenty pounds, and having a circular, flat, metallic, impacting face of twenty square inches; second, a metallic hemisphere weighing fifteen pounds and having an impacting surface with a radius of 3.25 inches; and third, a metallic headform weighing eleven pounds (five kilograms). The report section within the F-355 test methodology lists various ways to collect and analyze data. The two most important measurements of the shock attenuating characteristics of a surfacing system are the G-max and the Severity Index. A G-max of 200 and a Severity Index of 1,000 are internationally recognized as the threshold for a skull concussion for a human being.

One of the most important objects of the present invention is to provide a seamless surfacing system that will not exceed a G-max reading of 200 nor a Severity Index value of 1,000 when tested with any of the three objects listed in the F-355 test methodology over a broad temperature range.

How this object and other advantages of the present invention are obtained will become more readily understood from the following brief description of the drawings and the subsequent detailed description of the preferred embodiments.

BRIEF DESCRIPTION OF THE DRAWINGS

FIG. 4A is a top plan view of a plurality of contiguous pads of the present invention.

FIG. 4B is a cross-sectional view taken along line 4B—4B in FIG. 4A.

FIG. 4C is a cross-sectional view taken along line 4C—4C in FIG. 1.

FIG. 4D is a bottom plan view of a pad of the present invention.

FIG. 8 is a perspective view of a pad of the present invention used as an athletic sports game surface.

DETAILED DESCRIPTION OF THE PREFERRED EMBODIMENTS

Figure 1:
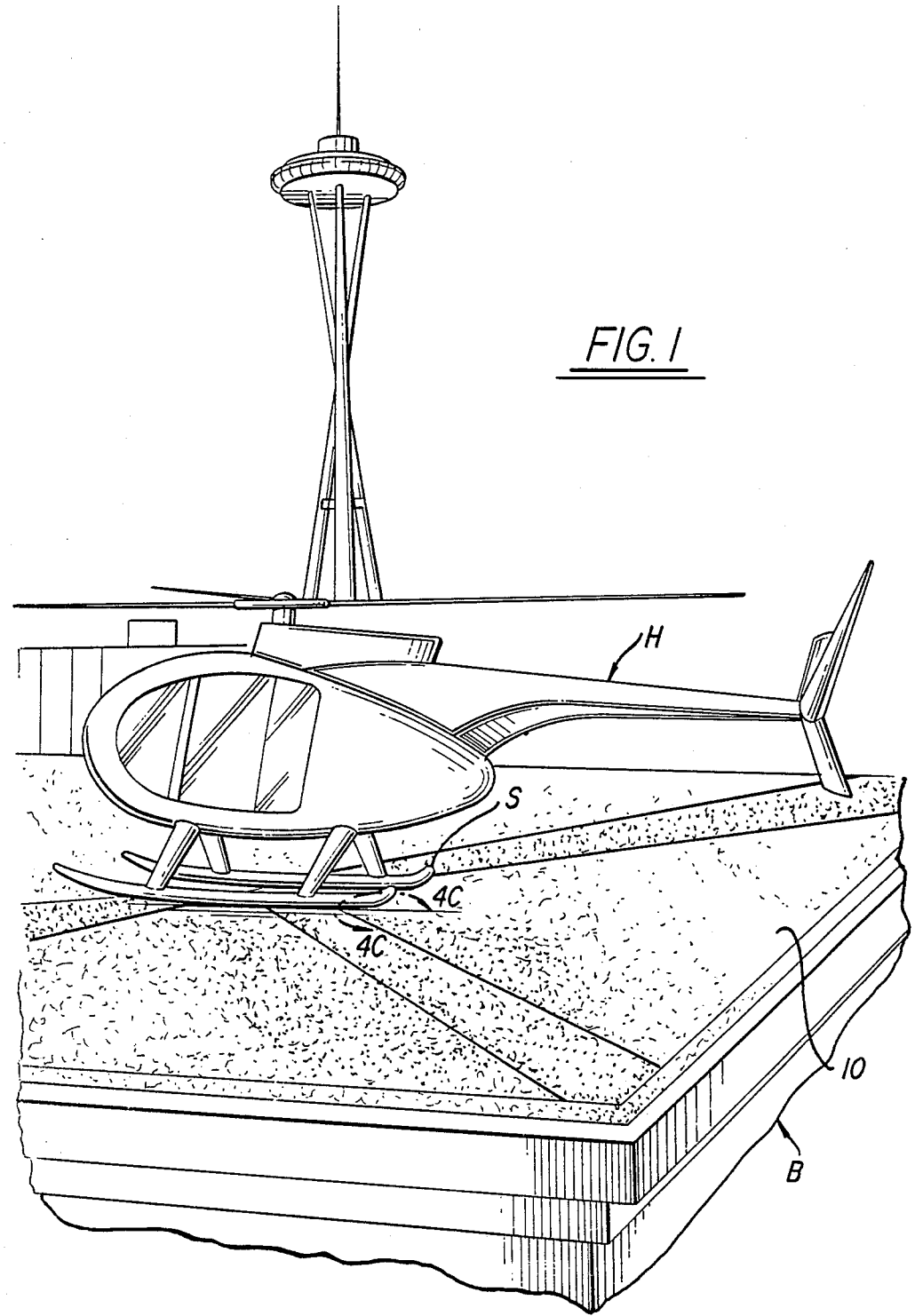
FIG. 1 is a perspective view of a helicopter on a helipad of the present invention.

In FIG. 1, a helicopter H with skids S rests on a helipad 10 of the present invention which has been installed on top of a building B.

Figure 2:
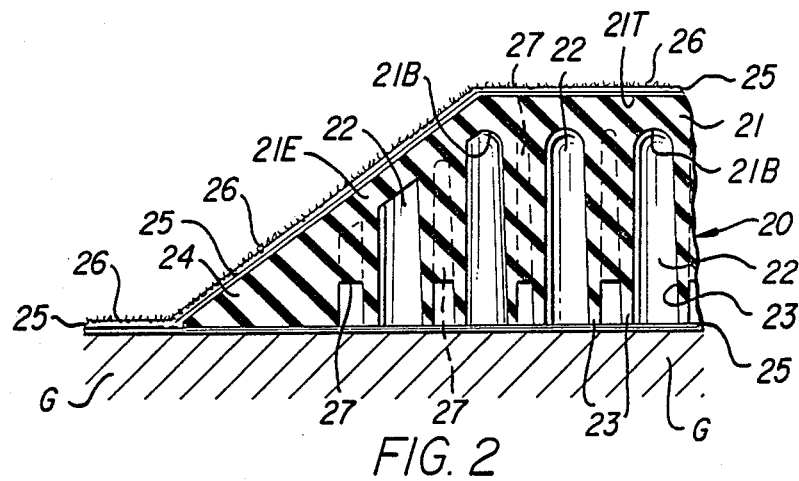
FIG. 2 is a cross sectional view of a pad of the present invention installed on the ground.

In FIG. 2, a first embodiment of an impact-absorbing safety mat 20 is placed on the ground G which may be an asphalt or concrete base. The mat 20 has a surface layer 21 with a bottom 21B and an outer edge 21E. A honeycombed array of air-filled cells 22 depend from the bottom 21B of the surface layer 21. Ribs 23 extend from the bottom 21B of the surface layer 21 and define the honeycombed array of air-filled cells 22. A sloping outer edge 24 surrounds all sides of the mat 20 and prevents the escape of air from the air-filled cells 22. A sealer 25 and an aggregate 26 are spread over a top 21T of the surface layer 21, the sloping outer edge 24, and the ground G immediately adjacent to the mat 20, so that the sealer 25 prevents the escape of air from the mat 20. A second layer of the sealer 25 is also spread under the array of air-filled cells 22 so that both air and moisture are prevented from entering into and escaping from the air-filled cells 22. This second bottom layer of the sealer 25 also helps to hold the array of air-filled cells 22 in a substantially vertical orientation with respect to the ground G. Median ribs 27 extend a shorter distance from the bottom 21B of the surface layer 21 than the defining ribs 23 and give added support to the surface layer 21 against a strong blow striking the array of air-filled cells 22.

Figure 3:
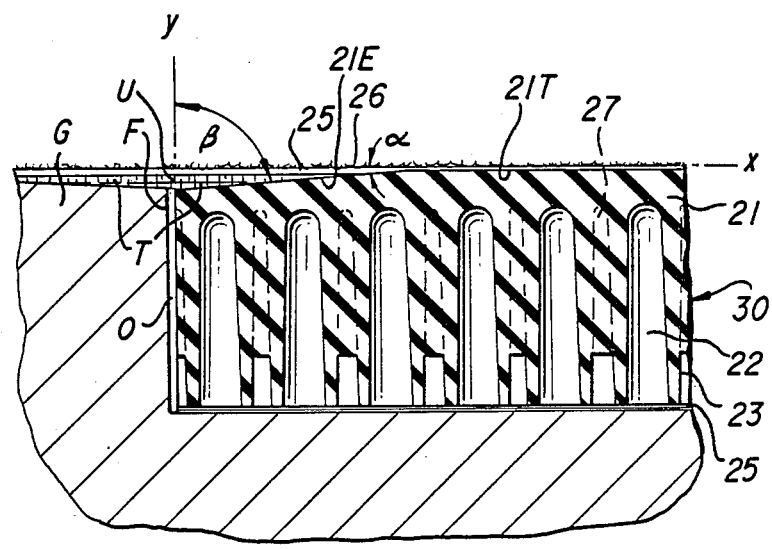
FIG. 3 is a cross sectional view of a pad of the present invention recessed in the ground.

In FIG. 3, a second embodiment of an impact-absorbing safety mat 30 is recessed in the ground G which again may be a concrete or asphalt base. The structure of the second embodiment is identical to the structure of the first embodiment described in FIG. 2 except that the second embodiment omits the sloping outer edge 24. Also, the surface layer 21 has a modified outer edge 21E which is a bevel or chamfer. A bevel is defined by Webster's New Collegiate Dictionary (1981) at page 105 as "the angle that one surface or line makes with another when they are not at right angles". In this second embodiment, the preferred gradation of an angle $\beta$ (beta) formed between the vertical y-axis extending along a face of the recess in the ground G and the beveled outer edge 21E is 83.75°. This angle $\beta$ is made by extending the outer edge 21E back two inches along the x-axis and dropping the outer edge 21E down one-eighth inch along the y-axis so that the angle $\beta$ has a 16:1 ratio or a complementary angle $\alpha$ (alpha) of 6.25°. An opening O left between the beveled outer edge 21E and the face F of the recess in the ground G is covered over with a fiberglass mesh tape T which is, in turn, penetrated by a urethane paste U comprised of urethane and fine mesh rubber granules that enter holes in the tape T, thus encapsulating the tape T, so that the tape T and the urethane paste U secure the mat 30 to the ground G. The encapsulated tape T, like the top 21T of the surface layer 21 and the ground G immediately adjacent to the beveled outer edge 21E, is then covered over by the sealer 25 and the aggregate 26 so that the top 21T of the surface layer 21 is flush with the top of the ground G. Thus, the mat 30 becomes seamless with the ground G to form an integrated installation therewith.

In FIG. 4A, a plurality of mats 30 are shown to be laid in a predetermined pattern. In this top view of FIG. 4A, the mats 30 are adjacent to each other. However, one layer of mats 30 may be placed on top of another layer in order to double the impact-absorbing ability of the integrated installation. The mats 30 are shown before the sealer 25 and the aggregate 26 are spread thereover. FIG. 4A also shows the outer edges 21E in solid lines, along which each mat 30 is joined, in a manner to be described with regard to FIG. 5C, to an adjacent identical mat 30. for the sake of simplicity, the bevel or chamfer on all four outer edges 21E is not shown, but is illustrated only along the face F of the recess seen in FIG. 3. In FIG. 4A, each mat 30 is preferably four feet long and two feet wide, as can be seen by viewing the solid lines which are drawn in a pattern showing the length of each mat 30 to be twice the width. Each dashed line shown in FIG. 4A represents a void area 27A where a median rib 27 is omitted during the manufacture of each mat 30. These void areas 27A are also made during the manufacture of each mat 20 shown in FIG. 2.

In FIG. 4B, the purpose of the void area 27A is shown to allow an installer to sever a selected mat 20 or 30 in half through the surface layer with a cutting knife K so that each 2' by 4' mat may become either a 2' by 2' mat or a 1' by 4' mat, depending upon whether the cut is made through the middle thereof widthwise or lengthwise, respectively. The provision of void areas 27A in the mats 20 and 30 may also be made in the helipad 10 shown in FIG. 1. For example, returning briefly to FIG. 4A, along the right hand side thereof, it may be seen from the solid lines that a plurality of mats 30A have been cut as 2' by 2' mats by cutting 2' by 4' mats 30 widthwise. Thus, surface configurations having odd footage measurements may be covered.

In FIG. 4C, the skid S of the helicopter H is shown contacting the aggregate 26 and sealer 25 on top of the surface layer 21 of the mat 10. Because the sealer 25 that covers the surface layer 21 on top of the mat 10 also seals off the bottom of each air-filled cell 22, the air compresses within each cell 22, thus allowing for excellent shock attenuation on impact of the skid S. Also, it can be seen that the sealer 25 and the median ribs 27 hold the air-filled cells 22 in a honeycombed array in a substantively vertical position with respect to the ground G, further enhancing shock attenuating characteristics.

A single layer of either mat 10, 20, or 30 has been subjected to the ASTM F-355 test and has been determined to satisfy the guidelines of the Consumer Product Safety Commission (hereinafter CPSC) for a six-foot drop of all of the three objects, i.e. the 20-lb. cylindrical missile, the 15-lb. metallic hemisphere, and the 11-lb. metallic headform, mentioned above in the Summary of the Invention. Furthermore, two layers, one laid upon the other, of either mat 10, 20, or 30 satisfies the CPSC guidelines for a twelve-foot drop of all three objects listed above. These guidelines are set forth in the Handbook for Public Playground Safety, Volume 2, page 22, Sections 12.1–12.5. The mats 10, 20, or 30 satisfying these guidelines help to prevent a child from suffering a skull concussion in a fall from standard playground equipment. Also, since the composite tensile strength of each mat 10, 20, or 30 exceeds 300 pounds per square inch (psi), children cannot vandalize the mats 10, 20, or 30 in place without the aid of tools.

Figure 5A:
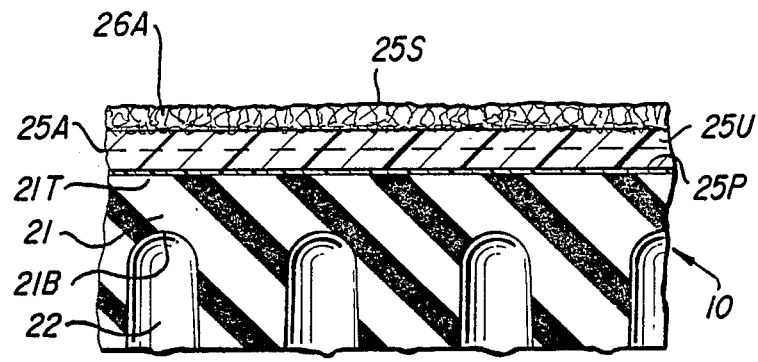
FIG. 5A is a partial cross-sectional view of a first embodiment of a top sealer and aggregate used in the present invention.
Figure 5B:
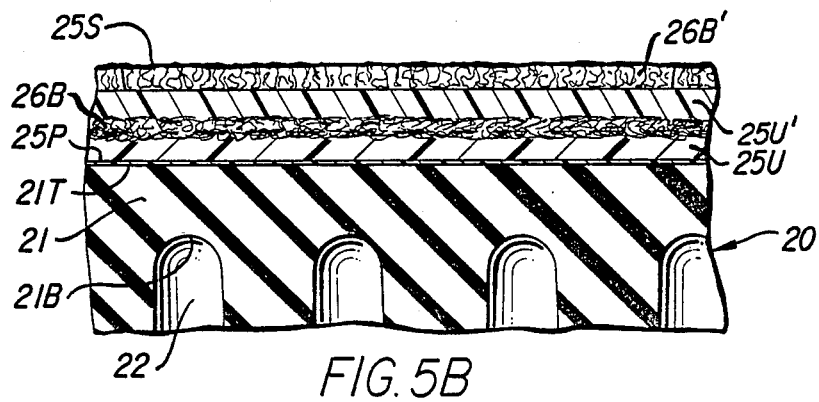
FIG. 5B is a partial cross-sectional view of a second embodiment of a top sealer and aggregate used in the present invention.
Figure 5C:
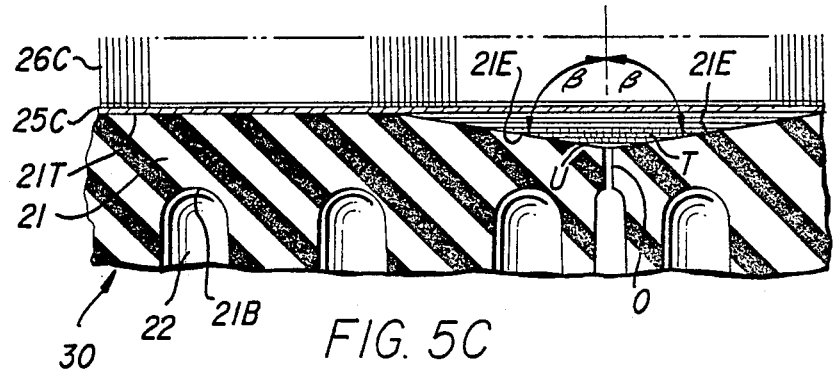
FIG. 5C is a partial cross-sectional view of a third embodiment of a top sealer and synthetic turf taken from FIG. 8.

In FIGS. 5A, 5B and 5C, three embodiments of the sealer 25 and aggregate 26 are shown. Each embodiment in FIGS. 5A, 5B and 5C is shown on the top 21T of the surface layer 21 with a plurality of air-filled cells 22 depending from the bottom 21B thereof.

In FIG. 5A, the helipad 10 is shown with a sealer 25A composed of a thin layer of a bottom urethane primer 25P and a top layer of a urethane 25U. The bottom primer 25P is used prior to the application of each top urethane 25U in order to strengthen the bond, thus preventing delamination of the top urethane 25U. The aggregate 26A is preferably a plurality of rubber granules broadcast into the top urethane 25U while still wet to the point of so-called "refusal". When the top urethane 25U has dried, the excess rubber granules of the aggregate 26A are removed and a urethane sealer 25S is applied over the textured surface, i.e. the top urethane 25U and the rubber granules comprising the aggregate 26A. Thus, the top urethane 25U is preferably a two-component urethane layer while the urethane sealer 25S is preferably a one-component urethane layer and the bottom primer 25P is also preferably a one-component urethane layer. Furthermore, an additional so called "leveler" coat consisting of another top urethane 25U and another plurality of rubber granules 26A comprising another aggregate may be applied over the bottom primer 25P prior to the application of the above-mentioned top urethane 25U in order to even out the irregularities that might protrude from the ground G and to further dissipate the kinetic energy of an impacting body.

In FIG. 5B, the mat 20 is preferred for use under exercising equipment in playgrounds and other play areas for children. The so-called "leveler" coat is then applied to the mat 20 in several steps. First, a bottom primer 25P is applied over the top 21T of the surface layer 21. Then, a urethane 25U is applied over the bottom primer 25P. Rubber granules comprising an aggregate 26B are next broadcast into the "wet" urethane 25U to the point of refusal. When the urethane 25U has dried, the excess rubber granules comprising the aggregate 26B are removed. The above steps are repeated with a second urethane 25U' applied over the rubber granules comprising the aggregate 26B followed by a second purality of rubber granules comprising another aggregate 26B' broadcast to the point of refusal into the urethane 25U'. When the second urethane 25U' has dried, the excess rubber granules comprising the aggregate 26B' are removed and a urethane sealer 25S is applied over the rubber granules making up the second aggregate 26B'. Thus, in this second embodiment of the sealer 25 and the aggregate 26, the sealer 25 includes a two-component urethane (25U, 25U') and a urethane sealer 25S while the aggregate 26 includes two layers of rubber granules (26B, 26B'). The "leveler" coat (25U and 26B) may be omitted if the ground G is not irregular enough to warrant its use, or if additional dissipation of the kinetic energy of an impacting body is not deemed necessary.

In FIG. 5C, the mat 30 is preferred for use on athletic fields and in arenas where different sports are played. In this third embodiment of the sealer 25 and the aggregate 26, the sealer 25 is a one-part "mastic" 25C which is defined by Webster's Dictionary, supra, at page 702, as "any of various pasty materials used as protective coatings or cements." The "aggregate" is a conventional synthetic turf 26C bonded to the mat 30 by the mastic 25C. Although the turf 26C is not an "aggregate" in the traditional sense, the turf is considered an "aggregate" for purposes of definition in this particular third embodiment.

Also, in FIG. 5C, the manner in which each mat 30 is joined to an adjacent identical mat 30, as mentioned in the discussion of FIG. 4A, is shown. First, each mat 30 is spaced by an opening O from the adjacent identical mat 30. This opening O allows for thermal expansion and contraction of each mat 30 laid down in a predetermined pattern shown in FIG. 4A. As seen at the right hand side of FIG. 5C, the opening O between outer edges 21E of adjacent mats 30 is seamed with the same fiberglass mesh tape T and urethane paste U used at the face F of the recess shown in FIG. 3. This tape T with the urethane paste U is built up until it fills the bevel or chamfer forming the angles between the adjacent outer edges 21E. Thereafter, the mastic 25C is applied over the tape T and the urethane paste U so that the turf 26C is bonded thereto. Thus, the entire athletic field or sports arena is seamless. The mastic 25C and the urethane paste U that cover the adjacent mats 30 eliminate seams and level out any flaws, in the nature of bumps and the like, that are manifested through the mats 30 from the ground G, thus beautifully enhancing the appearance of the entire athletic field or sports arena and also reducing maintenance costs.

Summarizing FIGS. 5A, 5B, and 5C, the sealer 25 and the aggregate 26 cover the mats 10, 20, or 30. A key function of the combined sealer 25 and aggregate 26 is to prevent any significant or rapid loss of attenuating properties due to weathering and/or exposure to ultraviolet radiation from the sun.

Referring to the helipad 10 shown in FIGS. 1, 4C, and 5A, its functions may be described as follows:

(1) to reduce substantially the shock load experienced by the helicopter H upon touchdown;

(2) to attenuate rotor vibrations while the helicopter H is idling down or warming up;

(3) to reduce substantially the level of noise present both inside and outside the helicopter H;

(4) to provide a seamless landing and takeoff surface capable of withstanding the caustic properties of aviation fuels and related aircraft fluids;

(5) to provide a surface capable of sufficiently attenuating the impact of tools, aircraft parts, and munitions in order to eliminate or at least reduce the possibility of damage, misfiring, and sparking;

(6) to reduce substantially the costs of maintenance necessitated by damage caused by shocks to the helicopter H; and (7) to increase substantially the reliability and safety of the helicopter H.

Referring to the third embodiment of mat 30 shown in FIGS. 5C and 8 for use with athletic fields and sports arenas, it functions as denoted as follows:

(1) to provide a permanently installed and seamless attenuating mat 30 used under artificial turf playing surfaces;

(2) to provide an attenuating mat 30 with excellent shock absorption properties over a broad temperature range and with a long life cycle;

(3) to provide an attenuating mat 30 that, together with the integrated artificial turf 26C, constitutes a playing surface that is nearly identical in "feel" and playability to natural grass, but has significantly better shock absorption characteristics; and (4) to provide an attenuating mat 30 that, together with the integrated artificial turf 26C, constitutes a playing surface that will substantially reduce injuries when compared with a playing surface system comprising an artificial turf 26C laid over a conventional foam base.

Figure 6:
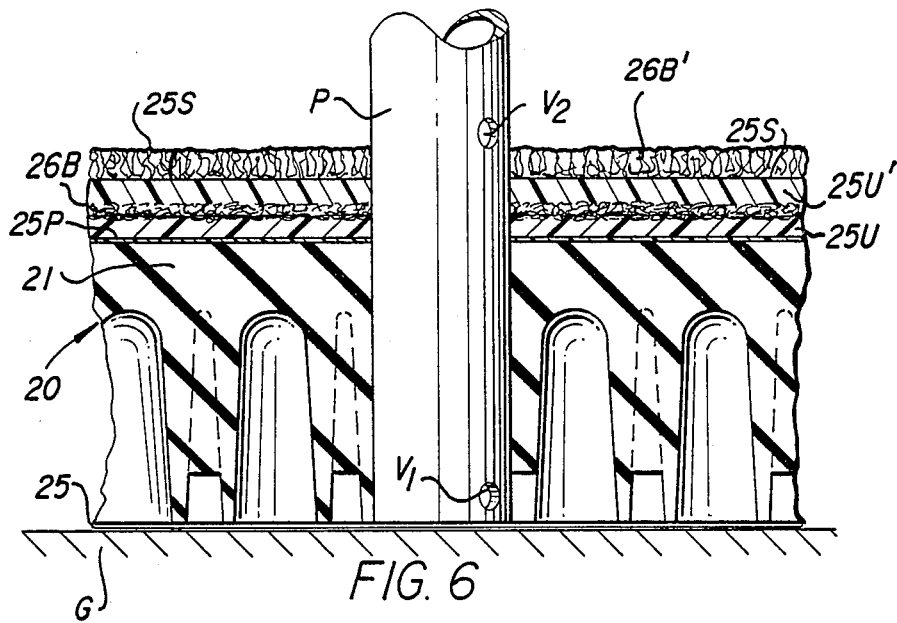
FIG. 6 is a cross-sectional view of a pad of the present invention used with playground equipment.
Figure 7:
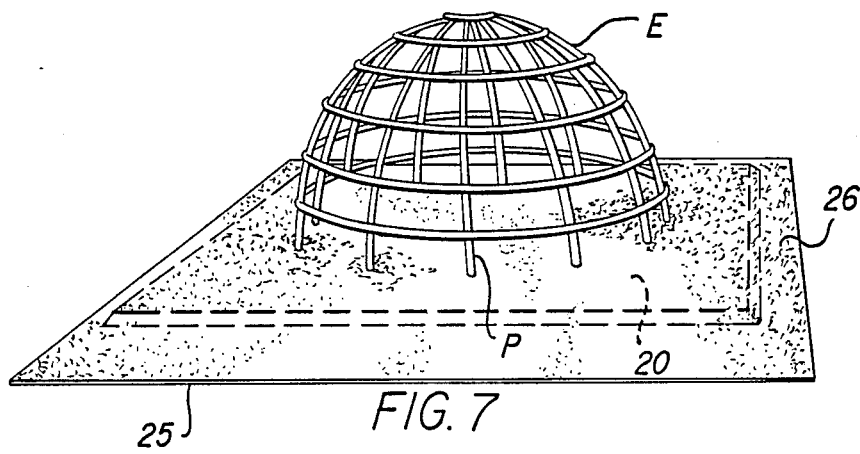
FIG. 7 is a perspective view of a pad of the present invention used under playground equipment.

In FIGS. 6 and 7, the second embodiment shown in FIG. 5B is illustrated in use in a playground or children's play area. In particular, with reference to FIG. 7, the mat 20 is shown in phantom lines underlying the top aggregate 26 and the sealer 25. A conventional piece of exercising equipment E with climbing poles P for children is installed thereover. Returning to FIG. 6, it is shown therein that each pole P of the climbing equipment E of FIG. 7 has at least one hole drilled as a vent $V_1$ above the bottom sealer 25 adjacent to the ground G but below the surface layer 21. The pole P also has at least one hole drilled as a vent $V_2$ above the top aggregate 26B' and the urethane sealer 25S. These vents $V_1$ and $V_2$ allow the mat 20 to be ventilated both internally and externally in order to remove any moisture and other gas vapors that may be carried up through the bottom sealer 25 from the ground G. Thus, this passage made between vents $V_1$ and $V_2$ through the pole P relieves any gas pressure resulting, for example, from heat generated by steam percolated on hot days or from moisture migrated up on cool days through the ground G or otherwise somehow introduced between the bottom sealer 25 and the top urethane sealer 25S.

In FIG. 8, the third embodiment shown in FIG. 5C is illustrated in use as an athletic sports game surface. In this example, the field is being used to play football.

The foregoing preferred embodiments are considered illustrative only. Numerous other modifications will readily occur to those persons skilled in this particular technology after reading this specification. Consequently, the disclosed invention is not limited by the exact construction and operation shown and described above but rather is defined by the claims appended hereto.

What I claim as my invention is:

1. A sports game surface, for placement on a base, comprising:

a surface layer having a bottom and outer edges;

an array of air-filled cells affixed to the bottom of the surface layer;

rib means, extending from the bottom of the surface layer, for defining the array of air-filled cells;

sealer and synthetic turf spread over the surface layer and the base immediate to edges of the sports game surface;

a plurality of median rib means, extending a shorter distance from the bottom of the surface layer than the defining rib means, for giving added support against a strong blow striking the surface layer and the array of air-filled cells affixed thereto; and at least one void area means, arranged in place of at least one of the plurality of median rib means, for facilitating cutting of the sports game surface through the surface layer.

2. The sports game surface, according to claim 1, wherein:

said void area means includes one void area provided through a middle of the array of air-filled cells lengthwise and a second void area provided through a middle of the array of air-filled cells widthwise.

3. The sports game surface, according to claim 1, wherein:

said array of air-filled cells is a honeycomb.

4. The sports game surface, according to claim 1, wherein:

said sports game surface is capable of being joined to an identical sports game surface.

5. A sports game surface, for placement on a base, comprising:

a surface layer having a bottom and outer edges;

an array of air-filled cells affixed to the bottom of the surface layer;

rib means, extending from the bottom of the surface layer, for defining the array of air-filled cells;

a synthetic turf and a first layer of sealer means, spread over the surface layer and the base immediate to edges of the sports game surface, for preventing the escape of air therefrom upon impact thereto;

median rib means, extending a shorter distance from the bottom of the surface layer than the defining rib means, for giving added support against a strong blow striking the surface layer and the array of air-filled cells affixed thereto; and a second layer of sealer means, spread under the array of air-filled cells and above the base, for preventing the escape of air therefrom upon impact thereto and also for holding the array of air-filled cells in a substantially vertical orientation with respect to the base.

6. The sports game surface, according to claim 5, wherein:
said array of air-filled cells is a honeycomb.

7. The sports game surface, according to claim 5, wherein:
said sports game surface is capable of being joined to an identical sports game surface.

8. A sports game surface, for placement on a base, comprising:
a surface layer having a bottom and outer edges;
an array of air-filled cells affixed to the bottom of the surface layer;
rib means, extending from the bottom of the surface layer, for defining the array of air-filled cells;
a sloping outer edge means, surrounding all sides of the sports game surface, for preventing the escape of air therefrom;
a synthetic turf and a sealer means, spread over the surface layer, the sloping outer edge means, and the base immediate to edges of the sports game surface, for preventing loss of attenuating properties in the sports game surface due to weathering and exposure to ultraviolet solar radiation; and
median rib means, extending a shorter distance from the bottom of the surface layer than the defining rib means, for giving added support against a strong blow striking the surface layer and the array of air-filled cells affixed thereto.

9. The sports game surface, according to claim 8, wherein:
said array of air-filled cells is a honeycomb.

10. The sports game surface, according to claim 8, wherein:
said sports game surface is capable of being joined to an identical sports game surface.

11. A sports game surface, for placement in a recess in a base, comprising:
a surface layer having a bottom and outer edges;
an array of air-filled cells affixed to the bottom of the surface layer;
rib means, extending from the bottom of the surface layer, for defining the array of air-filled cells;
a beveled outer edge means, surrounding all sides of the sports game surface, for facilitating attachment of the sports game surface to the base on at least one side of the sports game surface;
sealer and synthetic turf spread over the surface layer, the beveled outer edge means, and the base immediate to edges of the sports game surface; and
median rib means, extending a shorter distance from the bottom of the surface layer than the defining rib means, for giving added support against a strong blow striking the surface layer and the array of air-filled cells affixed thereto;
whereby the sports game surface placed in the recess in the base forms an integrated installation with the recess in the base.

12. The sports game surface, according to claim 11, wherein:
said array of air-filled cells is a honeycomb.

13. The sports game surface, according to claim 11, wherein:
said sports game surface is capable of being joined to an identical sports game surface.

14. The sports game surface, according to claim 11, further comprising:
tape means, secured to the beveled outer edge means and the base, for attaching the sports game surface flush with the base on at least one side of the sports game surface.

15. The sports game surface, according to claim 14, further comprising:
paste means, applied to the tape means, for facilitating attachment of the sports game surface flush with the base on at least one side of the sports game surface.

* * * * *

UNITED STATES PATENT AND TRADEMARK OFFICE
CERTIFICATE OF CORRECTION

PATENT NO. : 4,846,457

DATED : July 11, 1989

INVENTOR(S) : Thomas M. Vaux

It is certified that error appears in the above-identified patent and that said Letters Patent is hereby corrected as shown below:

Cover Page, right col., Abstract, line 4, "bottom" should be --bottom--.

Sheet 3 of six drawing sheets, in Fig. 4C, the solid lead lines from reference numeral 22 should be dashed as follows: (see attached sheet)

Signed and Sealed this

Thirty-first Day of July, 1990

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,846,457

DATED : July 11, 1989

INVENTOR(S) : Thomas M. Vaux

Page 2 of 3

It is certified that error appears in the above-identified patent and that said Letters Patent is hereby corrected as shown below:

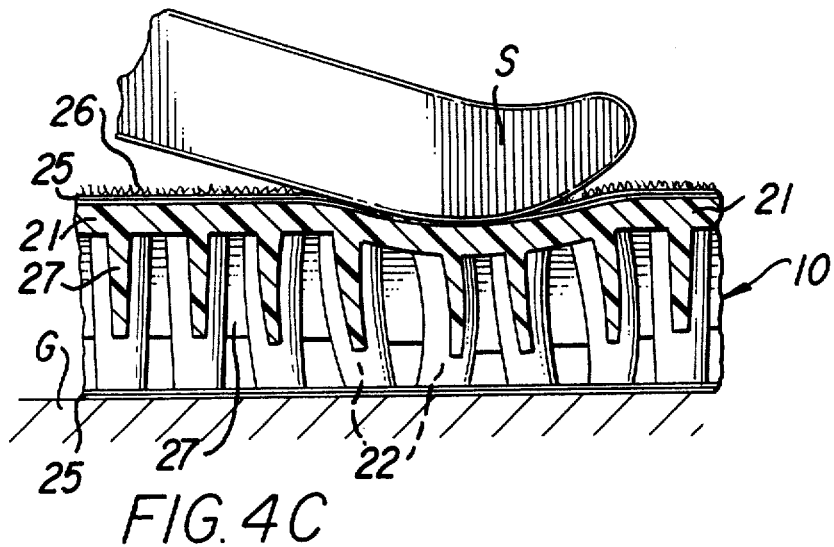

FIG. 4C

UNITED STATES PATENT AND TRADEMARK OFFICE
CERTIFICATE OF CORRECTION

PATENT NO. : 4,846,457
DATED : July 11, 1989
INVENTOR(S) : Thomas M. Vaux

It is certified that error appears in the above-identified patent and that said Letters Patent is hereby corrected as shown below:

Sheet 3 of six drawing sheets, insert the following omitted Fig. 4D:

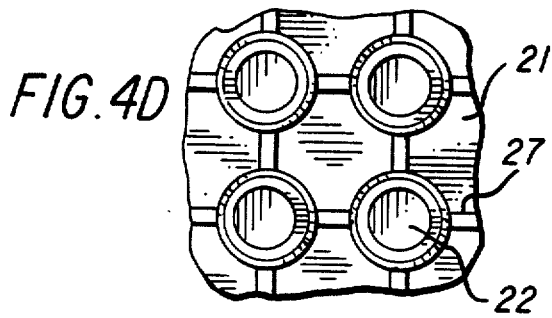

Col. 1, line 25, change " 1/64 inch (8 millimeters)" to --1/125 inch (8 mils)--.
Col. 1, line 48, change "and" to --which are--.
Col. 1, line 60, "non-loose-fill" should be --nonloose-fill--.
Col. 1, line 68, "4,557,457" should be --4,557,475--.
Col. 3, line 22, "cross sectional" should be --cross-sectional--.
Col. 3, line 24, "cross sectional" should be --cross-sectional--.
Col. 4, line 55, "for" should be --For--.
Col. 5, line 1, after "layer" insert --21--.
Col. 5, line 66, "so called" should be --so-called--.
Col. 6, line 20, "purality" should be --plurality--.
Col. 8, line 15, between "is" and the colon (:), insert --as follows--.